US009886385B1

(12) United States Patent
Huberty et al.

(10) Patent No.: US 9,886,385 B1
(45) Date of Patent: Feb. 6, 2018

(54) CONTENT-DIRECTED PREFETCH CIRCUIT WITH QUALITY FILTERING

(71) Applicant: Apple Inc., Cupertino, CA (US)

(72) Inventors: Tyler J. Huberty, Sunnyvale, CA (US); Stephan G. Meier, Los Altos, CA (US); Mridul Agarwal, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 12 days.

(21) Appl. No.: 15/247,421

(22) Filed: Aug. 25, 2016

(51) Int. Cl.
*G06F 12/08* (2016.01)
*G06F 12/0862* (2016.01)
*G06F 12/0897* (2016.01)
*G06F 12/0864* (2016.01)

(52) U.S. Cl.
CPC ...... *G06F 12/0862* (2013.01); *G06F 12/0864* (2013.01); *G06F 12/0897* (2013.01); *G06F 2212/1024* (2013.01); *G06F 2212/6024* (2013.01)

(58) Field of Classification Search
CPC ............. G06F 12/0862; G06F 12/0897; G06F 12/0864; G06F 2212/1024; G06F 2212/6024
See application file for complete search history.

(56) References Cited

U.S. PATENT DOCUMENTS

| 7,519,777 | B1 | 4/2009 | Ekanadham et al. |
| 8,533,422 | B2 | 9/2013 | Subramaniam et al. |
| 8,954,678 | B2 | 2/2015 | Averbouch et al. |
| 8,977,819 | B2 | 3/2015 | Chirca et al. |
| 2009/0287903 | A1* | 11/2009 | Hsu ........................ G06F 8/4442 711/213 |

OTHER PUBLICATIONS

"A Decoupled Predictor-Directed Stream Prefetching Architecture"; Suleyman Sair, Timothy Sherwood, Brad Calder; Department of Computer Science and Engineering University of California, San Diego. (Year: 2003).*
"Prefetching using Markov Predictors"; Doug Joseph, Dirk Grunwald, ISCA'97 pp. 252-263 (Year: 1997).*
"Dependence based prefetching for linked data structures", Amir Roth, Andreas Moshovos, Gurindar S. Sohi; ASPLOS VIII pp. 115-126 (Year: 1998).*

* cited by examiner

*Primary Examiner* — Michael Alsip
(74) *Attorney, Agent, or Firm* — Anthony M. Petro; Meyertons, Hood, Kivlin, Kowert & Goetzel, P.C.

(57) ABSTRACT

In a content-directed prefetcher, a pointer detection circuit identifies a given memory pointer candidate within a data cache line fill from a lower level cache (LLC), where the LLC is at a lower level of a memory hierarchy relative to the data cache. A pointer filter circuit initiates a prefetch request to the LLC candidate dependent on determining that a given counter in a quality factor (QF) table satisfies QF counter threshold value. The QF table is indexed dependent upon a program counter address and relative cache line offset of the candidate. Upon initiation of the prefetch request, the given counter is updated to reflect a prefetch cost. In response to determining that a subsequent data cache line fill arriving from the LLC corresponds to the prefetch request for the given memory pointer candidate, a particular counter of the QF table may be updated to reflect a successful prefetch credit.

20 Claims, 6 Drawing Sheets

CONTENT-DIRECTED PREFETCH CIRCUIT WITH QUALITY FILTERING

BACKGROUND

Technical Field

Embodiments described herein relate to the field of processor hardware design and more particularly, to techniques for performing data prefetching.

Description of the Related Art

One common issue that affects processor performance is the availability of data that is needed to perform processor operations. If data consistently needed to be retrieved from off-processor storage every time it was utilized, processor performance would suffer, because the latency (i.e., length of time) for accessing off-processor storage is typically many multiples of the processor's execution cycle time. As a consequence, in the absence of other useful work to perform while waiting for externally-sourced data, the processor would be idle for many cycles.

Implementing a memory hierarchy that includes several levels of caches interposed between the processor and system memory is a typical solution to the problem of memory latency. Caches can be designed with much lower latency than system memory, such that so long as data is resident in one or more levels of cache when it is needed, the performance bottleneck presented by memory accesses may be substantially reduced or eliminated.

Because caches typically gain speed at the expense of overall capacity, only a small fraction of the total memory in a system can be cached at any given time. If executing code exhibits a high degree of locality (e.g., performs a large fraction of its data accesses within a relatively small region of memory capable of residing within a cache), then once the relevant region of memory is cached, the overall cache hit rate for such code may be high. But until the necessary data is cache-resident, the cache hit rate and resultant processor performance may be poor. Moreover, some processing workloads may exhibit poor locality, such that passively relying on the cache to eventually "warm up" after working through a set of initial cache misses may not result in optimal processor performance.

SUMMARY

Systems, apparatuses, and methods for performing content-directed prefetching are contemplated.

In various embodiments, an apparatus may include a pointer detection circuit and a pointer filter circuit. The pointer detection circuit may scan a data cache line fill arriving from a lower level cache and identify a given memory pointer candidate within the data cache line fill, where the lower level cache is at a lower level of a memory hierarchy relative to the data cache. The pointer filter circuit may initiate a prefetch request to the lower level cache for the given memory pointer candidate dependent on determining that the given memory pointer candidate satisfies a set of conditions.

The pointer filter circuit may include a quality factor (QF) table that stores a number of counters. The QF table may be indexed dependent upon a program counter address associated with the given memory pointer candidate and a relative cache line offset of the given memory pointer candidate. The set of conditions may include a determination that a given one of the counters indexed by the given memory pointer candidate satisfies a QF counter threshold value.

In response to initiation of the prefetch request for the given memory pointer candidate, the pointer filter circuit may update the given counter to reflect a prefetch cost. In response to determining that a subsequent data cache line fill arriving from the lower level cache corresponds to the prefetch request for the given memory pointer candidate, the pointer filter circuit may update a particular counter to reflect a successful prefetch credit.

In various embodiments, a processor may include a processor core that includes a data cache and a content-directed prefetcher, where the content-directed prefetcher includes a multidimensional quality factor (QF) table that stores a set of counters and is indexed according to several independently-determined index values. The processor may further include a lower level cache at a lower level of a memory hierarchy relative to the data cache.

During operation the content-directed prefetcher may identify, within a data cache line fill arriving from the lower level cache, a given memory pointer candidate. The prefetcher may further initiate a prefetch request to the lower level cache for the given memory pointer candidate dependent on determining that the given memory pointer candidate satisfies a set of conditions, where the set includes a determination that a given counter corresponding to the given memory pointer candidate satisfies a QF counter threshold value.

In response to initiation of the prefetch request for the given memory pointer candidate, the content-directed prefetcher may update the given counter to reflect a prefetch cost. Based on determining that a subsequent data cache line fill arriving from the lower level cache corresponds to the prefetch request for the given memory pointer candidate, the content-directed prefetcher may update a particular counter to reflect a successful prefetch credit.

In various embodiments, a method may include identifying a given memory pointer candidate within a data cache line fill arriving from a lower level cache, where the lower level cache is at a lower level of a memory hierarchy relative to a data cache, and retrieving a counter value corresponding to the given memory pointer candidate from a multidimensional quality factor (QF) table. The QF table may store a set of counters indexed according to several independently-determined index values.

The method may further include retrieving an adjacent-line counter value corresponding to the given memory pointer candidate from the QF table, where the QF table additionally stores a set of adjacent-line counters; initiating a prefetch request to the lower level cache for the given memory pointer candidate dependent upon determining that the counter value satisfies a QF counter threshold value; and initiating a separate prefetch request to the lower level cache for a cache line that is adjacent to the given memory pointer candidate dependent upon determining that the adjacent-line counter value satisfies a QF adjacent-line counter threshold value.

The method may further include updating the counter value stored in the QF table to reflect a prefetch cost dependent upon initiating the prefetch request for the given memory pointer candidate, and updating the adjacent-line counter value stored in the QF table to reflect the prefetch cost dependent upon initiating the separate prefetch request.

In response to determining that a subsequent data cache line fill arriving from the lower level cache corresponds to either the prefetch request or the separate prefetch request, the method may further include respectively updating a particular one of the counters or a particular one of the adjacent-line counters to reflect a successful prefetch credit.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
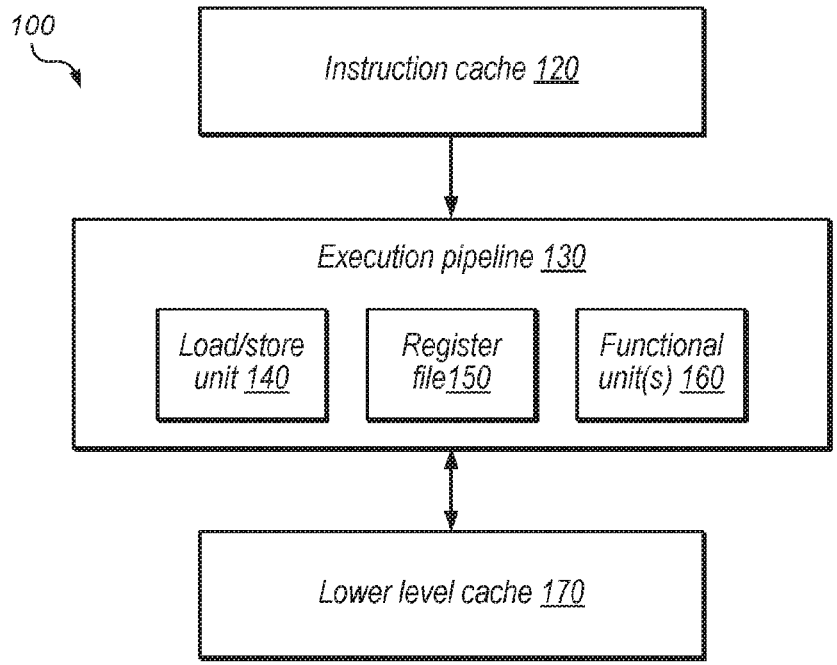
FIG. 1 is a block diagram illustrating an embodiment of an integrated circuit.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described here. It will be appreciated that for simplicity and clarity of illustration, elements shown in the figures have not necessarily been drawn to scale. For example, the dimensions of some of the elements may be exaggerated relative to other elements.

This specification includes references to "an embodiment." The appearance of the phrase "in an embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning "having the potential to"), rather than the mandatory sense (i.e., meaning "must"). Similarly, the words "include," "including," and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a processor . . . " Such a claim does not foreclose the system from including additional components (e.g., a display, a memory controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B. "Dependent on" may be employed as a synonym for "based on."

"In Response To." As used herein, this term is used to describe causality of events or conditions. For example, in the phrase "B occurs in response to A," there is a cause-and-effect relationship in which A causes B to occur. It is noted that this phrase does not entail that A is the only event that causes B to occur; B may also occur in response to other events or conditions that may be independent of or dependent on A. Moreover, this phrase does not foreclose the possibility that other events or conditions may also be required to cause B to occur. For example, in some instances, A alone may be sufficient to cause B to happen, whereas in other instances, A may be a necessary condition, but not a sufficient one (such as in the case that "B occurs in response to A and C").

"Each." With respect to a plurality or set of elements, the term "each" may be used to ascribe some characteristic to all the members of that plurality or set. But absent language to the contrary, use of "each" does not foreclose the possibility that other instances of the element might not include the characteristic. For example, in the phrase "a plurality of widgets, each of which exhibits property A," there must be at least two (and possibly arbitrarily many) widgets that exhibit property A. But without more, this does not foreclose the possibility of an additional widget, not a member of the plurality, that does not exhibit property A. In other words, absent language to the contrary, the term "each" does not refer to every possible instance of an element, but rather every element in a particular plurality or set.

INTRODUCTION

In the typical course of cache operation, data is not installed into a cache until there has been an attempt to access that data (e.g., in order to perform an operation) that results in a failure to locate the data within the cache (i.e., a "cache miss"). Because the data was not cache-resident the first time it was needed, the operation that needed the data will suffer a delay, reducing its performance. An alternative approach would be to attempt to cache data before it is needed to perform an operation, which if successful would eliminate the first-access performance penalty just described. Generally speaking, the technique of installing data into some level of a cache hierarchy in advance of the actual use of that data may be referred to as "prefetching."

Because successful prefetching requires some sort of identification of data in advance of its actual use, prefetching is generally predictive or speculative in nature. Prefetching techniques are often heuristic approaches that attempt to identify signals or patterns in the state of current processor operations or currently resident cache data. From those observations, a prefetcher predicts that a particular address is likely to be accessed in the future, and issues operations to retrieve data corresponding to that address into some level of a cache hierarchy.

Incorrect prefetching will generally not affect the correctness of processor operation, because data that is prefetched in error will simply not be used. However, incorrect prefetching may result in performance degradation, for example if prefetched data that is ultimately unused displaces data that would have been used. Prefetches may also compete with other types of memory accesses for finite memory bandwidth, such that some prefetches are ultimately not useful because they may displace or delay other types of memory accesses that might have been useful. Accordingly, in designing a prefetcher, care should be taken that the benefits of successful prefetch cases (e.g., instances in which prefetched data prevents a cache miss) are not outweighed by the costs of unsuccessful prefetches.

There are numerous types of behavioral patterns on which prefetcher operation may be predicated, and it is not uncommon to have multiple differently-configured prefetchers deployed within a processor design. The discussion below focuses on the particular example of a prefetcher that is configured to detect cases of "pointer chasing," although it is contemplated that the structures and techniques described below may also be employed with other types of prefetchers.

Generally speaking, in the context of load instructions, a pointer chasing scenario may arise when the destination of one load instruction forms a source operand of a subsequent load instruction. (A data value that is used as a memory address may also be referred to as a "pointer," in that such a data value references or "points" to another value stored in memory at that address.) Pointer chasing may arise during instances in which a workload is performing address arithmetic, for example to generate the address of a next element to be accessed in a data structure as a function of the address of a current element of the data structure.

A simple pseudocode example of pointer chasing is as follows:
load x0, [x1]//producer load
load x2, [x0, #16]//consumer load with 16B offset
In this example, the first load instruction reads the contents of memory at the address stored in register x1 and stores the result in destination register x0. The second load instruction uses the value of register x0, along with an offset value of 16, to generate the address to be accessed, the contents of which are stored in destination register x2. Because the first load produces a value that is later used as an address, it may be referred to as a "producer load," and the second load instruction that uses this value to form an address may be referred to as a "consumer load." It is noted that pointer chasing scenarios may also arise between store instructions or between mixed load and store instructions. For simplicity of presentation, the following discussion will assume that prefetching based on pointer chasing only occurs with respect to load instructions, which may provide a sufficient degree of performance improvement in various implementations. However, this disclosure is in no way limited to this case, and some embodiments may operate on store instructions or combinations of load and store instructions.

Because pointers are addresses, they may exhibit characteristics that enable them to be distinguished from other data values with accuracy that surpasses random chance. For example, when examining the data values currently stored within a cache line, potential pointer values may be significantly more likely than non-pointer values to have at least some higher-order bits that match corresponding higher-order bits of the address corresponding to that cache line. In principle, prefetching potential pointer values may increase overall processor performance, because pointers stored in a resident cache line are probabilistically likely to be accessed in the future. However, prefetching every potential pointer value may actually be counterproductive to performance, because of the resultant effects on memory bandwidth and the potential for excessive eviction of useful cache data.

The following discussion presents a filtered approach for prefetching of memory pointer candidates. At a high level of generality, the approach includes first scanning incoming data cache line fills for memory pointer candidates. The candidates are then filtered such that not every candidate is prefetched. In various embodiments, the filters may include a history filter that, broadly speaking, attempts to identify whether a given memory pointer candidate likely corresponds to a candidate that has been recently prefetched, in which case the given candidate may be discarded as a likely duplicate.

The filters may also include a multidimensional quality factor table that implements counter-based statistics for each of multiple memory pointer candidates, debiting a counter when a prefetch of a memory pointer candidate is initiated and crediting a counter when a prefetch is successfully completed. The filters may further include a global quality factor counter that is debited and credited based on any prefetch activity corresponding to memory pointer candidates. Whether to initiate a prefetch for a given memory pointer candidate may be conditioned on the state of a corresponding counter in the quality factor table as well as the global quality factor counter. By collecting and using such statistics, on average, prefetches may be suppressed for memory pointer candidates that are less likely to be successful, which in turn may improve the overall efficacy of prefetching.

Processor Overview

Turning now to FIG. 1, a block diagram of one embodiment of a portion of an integrated circuit 100 is shown. In various embodiments, integrated circuit 100 may correspond to a general-purpose processor, an embedded processor, a graphics processor, a digital signal processor (DSP), or any other type of processor that is generally capable of operating on digital data. In the illustrated embodiment, integrated circuit 100 includes an instruction cache 120 coupled to an execution pipeline 130, which is in turn coupled to a lower level cache (LLC) 170. As shown in FIG. 1, execution pipeline 130 further includes a load/store unit 140, a register file 150, and one or more functional units 160.

As a preliminary matter, it is noted that FIG. 1 is intended to illustrate several components that tend to be common to many digital integrated circuit designs. These components are illustrated at a high level of abstraction in order to facilitate the discussion of more particular features below. It is noted that integrated circuit 100 may include numerous features in addition to those shown, and may be organized in any suitable fashion beyond that shown here. In particular, it is noted that in some embodiments, integrated circuit 100 may correspond to a processor that includes multiple cores, each of which includes an instance of instruction cache 120, execution pipeline 130, and possibly other components. In some such embodiments, multiple cores may share access to a common LLC 170.

Instruction cache 120 may generally be configured to store instructions for execution by execution pipeline 130. For example, instruction cache 120 may be configured to fetch instructions from external storage (such as LLC 170 or system memory) well in advance of when those instructions are expected to be executed, in order to hide the latency of accessing external storage. In various embodiments, instruction cache 120 may be configured according to any suitable cache architecture (e.g., direct-mapped, set-associative, etc.). Integrated circuit 100 may also include other circuitry related to instruction fetch and issuance, such as instruction decode and/or issue logic, which may be included within instruction cache 120 or elsewhere. In some embodiments, instruction cache 120 or another component of integrated circuit 100 may include branch prediction circuitry, predication circuitry, or other features relating to the conditional or speculative execution of instructions.

Execution pipeline 130 may generally be configured to execute instructions issued from instruction cache 120 to perform various operations. Such instructions may be defined according to an instruction set architecture (ISA), such as the x86 ISA, the PowerPC™ ISA, the ARM™ ISA, or any other suitable architecture.

In the illustrated embodiment, execution pipeline 130 also includes load/store unit 140, an embodiment of which is described in greater detail below. Broadly speaking, load/store unit 140 may be an example of a functional unit that is configured to execute load and store instructions. For example, load/store unit 140 may compute addresses for load and store instructions and access a first-level data cache to obtain or store the corresponding data. In the event of a cache miss, load/store unit 140 may coordinate with LLC 170 to obtain the missing cache line. As described in greater detail below, in some embodiments, load/store unit 140 may also include a content-dependent prefetcher configured to prefetch memory pointer candidates.

Register file 150, also an illustrated component of execution pipeline 130, may be configured as a set of architecturally-visible registers and/or registers distinct from those specified by the ISA. For example, an ISA may specify a set of registers (such as a set of 32 64-bit registers denoted R0 through R31, for example) that executable instructions may specify as the source of data operands. However, in order to implement performance-improving schemes such as register renaming, register file 150 may implement a larger number of physical registers than those defined by the ISA, allowing architectural registers to be remapped to physical registers in ways that help resolve certain types of data dependencies between instructions. Accordingly, register file 150 may be substantially larger than the minimum set of architecturally-visible registers defined by the ISA. Moreover, register file 150 may be implemented in a multi-ported fashion in order to support multiple concurrent read and write operations by different, concurrently-executing instructions. In various embodiments, logic to perform register renaming, port scheduling and/or arbitration, or any other aspects relating to the operation of register file 150 may be included within register file 150 itself or within another unit.

Functional unit(s) 160 may be configured to carry out many of the various types of operations specified by a given ISA. For example, functional unit(s) 160 may include combinatorial logic configured to implement various arithmetic and/or logical operations, such as integer or floating-point arithmetic, Boolean operations, shift/rotate operations, or any other suitable functionality. In some embodiments, execution pipeline 130 may include multiple different functional units 160 that differ in terms of the types of operations they support. For example, execution pipeline 130 may include a floating point unit configured to perform floating-point arithmetic, one or more integer arithmetic/logic units (ALUs) configured to perform integer arithmetic and Boolean functions, a graphics unit configured to implement operations particular to graphics-processing algorithms, and/or other types of units. Load/store unit 140 may also be an example of functional unit(s) 160, although it has been called out separately for the purposes of the present discussion.

LLC 170 may be configured as an intermediate cache within a memory hierarchy. For example, LLC 170 may be a second-level cache interposed between external system memory and the first-level instruction cache 120 and a first-level data cache (which may be included within load/store unit 140, as described below). Although often larger and slower than first-level caches, LLC 170 may nevertheless be substantially faster to access than external random-access memory (RAM), and its inclusion may improve the average latency experience by a typical load or store operation. LLC 170 may be configured according to any suitable cache geometry, which may differ from the geometries employed for higher-level caches. In some embodiments, still further caches may be interposed between LLC 170 and system memory, or between lower-level cache 170 and the first level cache(s).

Figure 2:
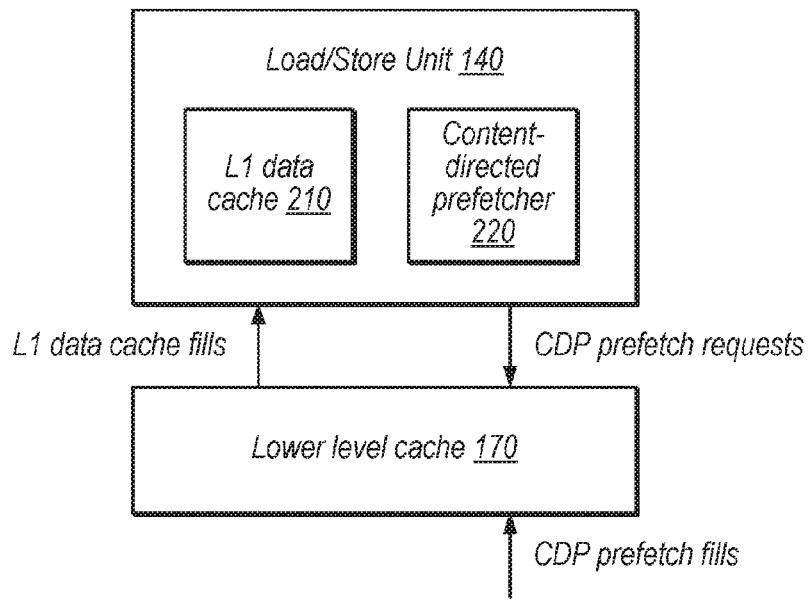
FIG. 2 is a block diagram illustrating an embodiment of a load/store unit.

FIG. 2 illustrates an embodiment of load/store unit 140 in greater detail. In the illustrated embodiment, load/store unit 140 includes a level one (L1) data cache 140 and a content-directed prefetcher (CDP) 220. In various embodiments, it is contemplated that L1 data cache 140 may be located externally to load/store unit 140, and/or that load/store unit 140 may include other components (such as, e.g., circuitry for performing address generation arithmetic).

Similar to instruction cache 120, L1 data cache 140 may provide temporary storage for data retrieved from another, slower memory within a memory hierarchy. Instructions executed by execution pipeline 130 may access the contents of L1 data cache 140 through explicit load or store instructions, or via other instructions that implicitly reference load/store operations in combination with other operations, depending on the characteristics of the implemented ISA. L1 data cache 140 may be organized as direct-mapped, set-associative, or according to any other suitable cache geometry, and may implement single or multiple read and write ports.

As described in greater detail below, CDP 220 may generally be configured to identify memory pointer candidates within data cache line fills arriving from LLC 170, and to apply a set of conditions to a given memory pointer candidate to determine whether to initiate a prefetch request to LLC 170 for that candidate. The set of conditions may include determining whether the state of various filters is satisfied by the given memory pointer candidate, for example comparing one or more counters associated with each filter with a corresponding threshold value. The state of the filters may be updated as prefetch requests are initiated and completed, so that the filters adapt dynamically.

Overview of Content-Directed Prefetcher and Pointer Identification

Figure 3:
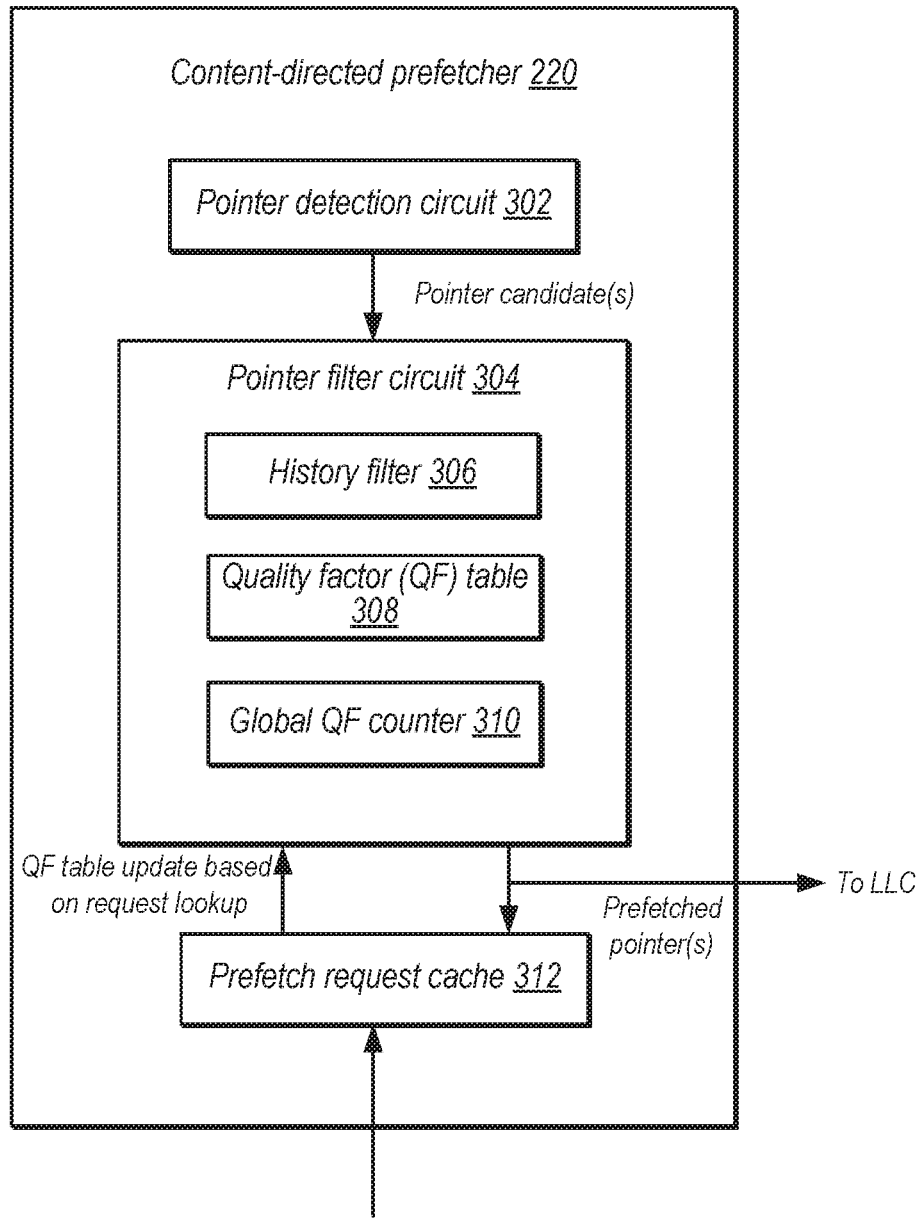
FIG. 3 is a block diagram illustrating an embodiment of a content-directed prefetcher.

An embodiment of content-directed prefetcher 220 is shown in FIG. 3. In the illustrated embodiment, CDP 220 includes a pointer detection circuit 302 configured to identify memory pointer candidates to a pointer filter circuit 304. Pointer filter circuit 304 conditionally issues prefetch requests to LLC 170 for memory pointer candidates dependent upon the state of various filters, which in the illustrated embodiment include a history filter 306, a quality factor (QF) table 308, and a global QF counter 310. Pointer filter circuit 304 is also coupled to identify prefetched pointer candidates to a prefetch request cache 312, which is in turn coupled to receive L1 data cache fills from LLC 170 and to provide information to pointer filter circuit 304 to enable the update of QF table 308 for cache line fills arising from prefetch requests.

Pointer detection circuit 302 may be configured to scan data cache line fills arriving from LLC 170 for memory pointer candidates. (In some embodiments, pointer detection circuit 302 may be configured to operate on cache lines resident in L1 data cache 210 instead of incoming fills.) In some embodiments, pointer detection circuit 302 may be configured to scan only data cache line fills resulting from load instructions, although in other embodiments fills resulting from store instructions may also be scanned. Data cache line fills may result from cache misses in L1 data cache 210, from prefetch requests, or from other causes, although certain embodiments may restrict scanning to fills originating from particular events. In some embodiments, data cache line fills marked with a do-not-scan hint by LLC 170 may not be scanned; this hint may help prevent previously-scanned cache lines from being redundantly processed. For example, LLC 170 may denote whether a particular data cache line fill was previously sent to L1 data cache 210, in which case it may not need to be rescanned.

In some embodiments, the contents of the data cache line fill may be scanned only on boundaries of a defined number of bytes (e.g., 8-byte boundaries) on the assumption that pointers will likely be aligned within memory; such an assumption may simplify the design of pointer detection circuit 302. For example, if a data cache line fill is 64 bytes, but pointers are assumed to be aligned on 64-bit (8-byte) boundaries, then only 8 comparisons would need to be performed per fill. In other embodiments, scanning for memory pointer candidates may occur on more coarse- or fine-grained boundaries.

Identification of memory pointer candidates may be performed according to any suitable algorithm. In some embodiments, an entry of the data cache line fill may be deemed to be a memory pointer candidate if a defined number of its highest-order bits (e.g., the highest 16 bits, 20 bits, etc.) matches the same range of bits of the load (or store) address that resulted in the data cache line fill. The exact number of bits employed may vary in different embodiments, and need not be contiguous. In some embodiments, pointer detection may be performed based on virtual addresses, with any necessary address translation occurring in subsequent processing stages.

In some embodiments, pointer detection circuit 302 may be configured to perform further checks or entirely exclude certain entries of a data cache line fill that would otherwise be identified as memory pointer candidates, based on various conditions. For example, if the compared bits are either all zeroes or all ones, additional bits may be examined (and, e.g., required not to match), which may facilitate pointer detection at extreme lower or upper ends of the address range—where address values may be more likely to coincide with small positive or negative integer data values. Specific checks for particular values that should be excluded as pointer candidates may also be performed, depending on the idiosyncrasies of a particular processor architecture and/or software environment.

Once a memory pointer candidate has been identified, pointer detection circuit 302 may compute the relative offset of that candidate. In some embodiments, the relative offset of a memory pointer candidate may be defined as the difference between the numerical position of the candidate within the possible entries of the data cache line fill, and a subset of bits of the address that resulted in the data cache line fill. For example, if the data cache line fill contains 64 bytes and scanning is performed on 8-byte boundaries, then there are 8 possible positions for a memory pointer candidate, and bits [5:3] of the address of the fill (also aligned on an 8-byte boundary) may be employed to calculate the relative offset. In the case of 128-byte lines examined on 4-byte boundaries, there would be 32 possible positions, and address bits [6:2] may be employed to calculate the relative offset. However computed, the relative offset may subsequently be scaled so that it is a non-negative number, for example by adding a constant value to the initial result. For example, in the case of a cache line having 8 possible positions for a memory pointer candidate, the initially calculated relative offset may range from −7 to +7. When scaled to a non-negative range, the relative offset may take values from 0 to 14. Other configurations are of course possible.

Identified memory pointer candidates may be inserted into a queue or other type of storage circuit for subsequent processing by pointer filter circuit 302. In some embodiments, the stored information may include the virtual address value corresponding to the memory pointer candidate, the relative offset for the candidate computed as described above, and (as discussed in greater detail below) a hashed value of the program counter address corresponding to the load (or store) instruction that brought in the data cache line fill containing the memory pointer candidate. If a queue is employed, memory pointer candidates may be enqueued and dequeued in an order that is implied by the structure of the queue. If another type of storage circuit is employed (such as a random access buffer, for example), a timestamp or other value that explicitly identifies the order of a memory pointer candidate may also be stored. If the capacity of the storage structure is reached, further scanning for memory pointer candidates may stall, new candidates may be discarded until storage capacity becomes available, or existing candidates may be overwritten (e.g., oldest entries first).

Memory Pointer Candidate Filtering

As noted previously, it may be counterproductive to prefetch every memory pointer candidate identified by pointer detection circuit 302. Pointer filter circuit 304 may be configured to apply various filters to a memory pointer candidate before determining to initiate a prefetch for that candidate. In the illustrated embodiment, three distinct filters are shown, although in other embodiments, one or more of these may be omitted, and/or other types of filters may be included.

History filter 306 may be configured to store information indicative of a set of memory pointer candidates for which prefetch requests have been initiated, and may help reduce the issuance of redundant prefetch requests. When pointer filter circuit 304 is evaluating whether to initiate a prefetch request for a given memory pointer candidate, it may examine the information stored in history filter 306. If information corresponding to the given memory pointer candidate is present within history filter 306, the given memory pointer candidate may be discarded without initiating a prefetch request. Otherwise, if the remaining filter conditions are satisfied and a prefetch request is initiated, information indicative of the given memory pointer candidate may be inserted into history filter 306.

In various embodiments, history filter 306 may be organized in any suitable manner. For example, history filter 306 may be organized as a direct-mapped structure having a number of entries that are indexed by one portion of the virtual address bits associated with memory pointer candidates, where each entry stores another portion of the virtual address bits. In order to keep history filter 306 compact, in some embodiments the virtual address corresponding to each memory pointer candidate may be hashed to a smaller set of bits, which may then be used by history filter 306. For example, a virtual address of 32 bits or more may be hashed down to 16 bits. A 128-entry structure may then use 7 of these 16 bits as an index and store the remaining 9 bits in the corresponding entry as a tag value to be compared against subsequent memory pointer candidates that index that entry. A 256-entry structure, by contrast, may use 8 index bits and store 8 tag bits. Other configurations of hashed addresses and corresponding structures are possible and contemplated.

By definition, use of a hash function raises the possibility of a collision, where two distinct memory pointer candidates may map to the same entry of history filter 306 or other hashed structures described below. However, because prefetching is a speculative task, absolute fidelity is not required, and a performance benefit may still be realized despite the possibility of hash collisions. Performance modeling of expected workloads may be performed during the design process to identify the effects of using less restrictive hashes and larger resulting structures versus more restrictive hashes and smaller resulting restructures. Depending on the relative importance of die area, power consumption, and processing performance for a particular processor design, the hashed storage structures may be tuned accordingly.

Quality factor (QF) table 308 may be configured to provide a different type of filtering than history filter 306. As briefly noted above, QF table 308 may implement a multidimensional table of counters indexed according to several different index values that are independently determined for a given memory pointer candidate. Broadly speaking, if a given counter that is indexed by a given memory pointer candidate satisfies a QF counter threshold value (e.g., is greater than zero), then the QF table filter condition may be satisfied for the given memory pointer candidate. By contrast, if the QF counter threshold value is not satisfied, the given memory pointer candidate may be discarded without generating a prefetch request.

Moreover, the counters of QF table 308 may dynamically change during operation of CDP 220. In some embodiments, the counter corresponding to a given memory pointer candidate may be updated to reflect a prefetch cost (e.g., by decrementing the counter) when a prefetch is generated for the given memory pointer candidate. As described in greater detail below, a successful prefetch may result in the counter being updated to reflect a successful prefetch credit (e.g., by incrementing the counter). Thus, for example, if prefetch costs associated with a particular counter are not balanced by successful prefetch credits, then over time, the value of the particular counter may no longer satisfy the QF counter threshold value (e.g., by decreasing to zero). Memory pointer candidates that map to the particular counter may then fail the filter condition implemented by QF table 308, based on the prior performance of prefetches associated with that counter.

Figure 4:
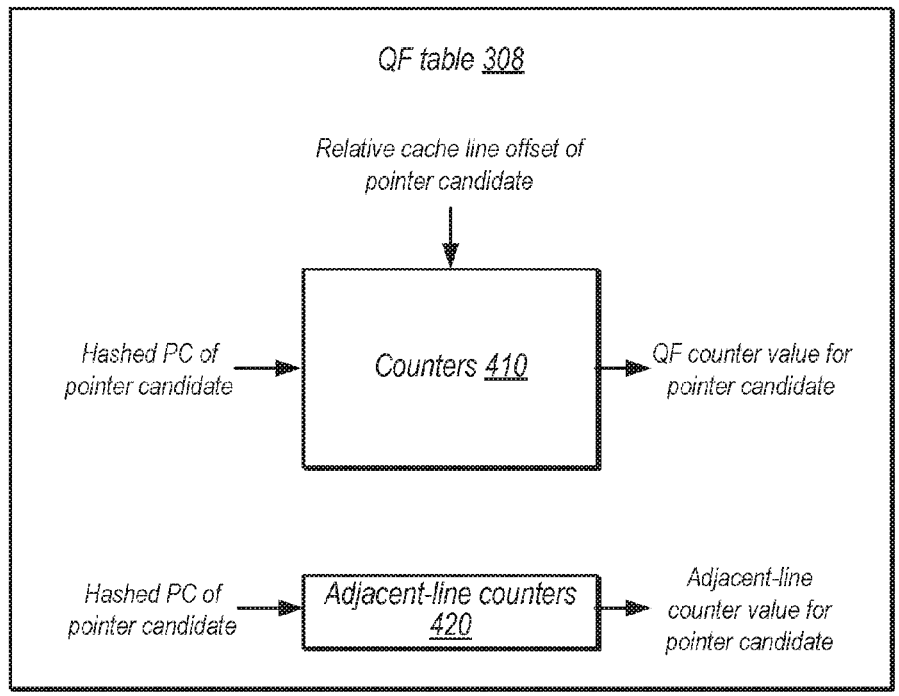
FIG. 4 is a block diagram illustrating an embodiment of a quality factor table.

One example illustrating a possible organization of QF table 308 is shown in FIG. 4. In the illustrated embodiment, QF table 308 includes a set of counters 410 (as well as a set of adjacent-line counters 420, which will be discussed subsequently). Collectively, counters 410 may represent an example of a multidimensional table that is indexed according to several independently-determined index values. As shown, counters 410 are indexed by two distinct index values: a hashed program counter (PC) value corresponding to a given memory pointer candidate (e.g., as computed from the PC of the load or store instruction that brought the line containing the candidate into L1 data cache 210, though other techniques are possible), and the relative offset computed for the given memory pointer candidate as described above.

In some embodiments, counters 410 may be logically implemented as a set of tables, where to access a counter corresponding to a given memory pointer candidate, a particular table is selected according to one of the index values determined for the candidate, and a particular entry of the selected table may be selected according to another one of the index values. For example, the hashed PC value may be decoded to select 1 of $2^N$ tables, where N denotes the number of bits in the hashed PC value. Within the selected table, the relative offset may be decoded to select one of M entries, where M denotes the number of possible values in the relative offset range. The resultant entry may store the counter value to be tested for the given memory pointer candidate and adjusted for costs/credits of prefetches associated with that candidate. In other embodiments, the manner of accessing a particular counter (e.g., the order of decoding and applying the index values) may vary. Moreover, the physical structure of counters 410 need not resemble the logical structure described here; for example, instead of being physically implemented as a set of discrete tables, counters 410 may be implemented as a single, two-dimensional storage array.

Each of counters 410 may be implemented as a storage entry for a counter value. The numerical range implemented by each counter may be selected as a design parameter, and may reflect both physical size and performance considerations. For example, a 4-bit counter would be more compact than an 8-bit counter, but would permit fewer outstanding or uncredited prefetches. The logic needed to update the counter value to reflect a prefetch cost or credit may be implemented elsewhere within QF table 308 or CDP 220. In some embodiments, when reset, each of counters 410 may be set to a maximum value, and subsequently decremented to reflect a prefetch cost and incremented to reflect a successful prefetch credit. However, any suitable configuration may be used.

As noted above with respect to history filter 306, use of a hash function to generate the hashed PC index value may raise the possibility of collisions, where multiple memory pointer candidates may map to the same counter value. As discussed above, performance modeling for an expected computational workload may enable the hashing to be tuned to deliver a useful benefit while permitting a compact design. Additionally, in some embodiments, all of counters 410 may be periodically reset (e.g., after a certain number of cache line fills have been scanned by CDP 220, or according to another condition). Periodic resetting may help prevent the prefetch statistics represented by counters 410 from becoming overly stale, particularly as the computational workload evolves over time, and may also help ameliorate the effects of hash collisions.

The use of a hashed PC and a relative offset to index counters 410 within QF table 308 represents one example of a multidimensional array of counters indexed by independent values. The use of two different values related to a given memory pointer to select a corresponding counter 410 may result in more effective prefetch behavior than using only a single value. In other embodiments, it is noted that three or more independently-determined index values may be employed. Other types of index values may include, for example: information indicative of a total number of memory pointer candidates detected within the data cache line fill; information indicative of a recursive depth of the given memory pointer candidate; and/or information indicative of a region of virtual memory addresses in which the given memory pointer candidate is located.

When prefetching in the manner described here, it may often be useful to prefetch not only the cache line corresponding to a given memory pointer candidate, but one or more cache lines adjacent to that address. For example, a data structure referenced by a memory pointer might not fit within a single cache line, and prefetching additional cache line(s) based on a memory pointer candidate may increase the likelihood of future cache hits when accessing that data structure.

Accordingly, in some embodiments, CDP 220 may be configured to prefetch not just a given memory pointer candidate, but may also initiate a separate prefetch to a cache line adjacent to the given memory pointer candidate. (Multiple separate prefetches may be initiated for multiple lines adjacent to the candidate, in some embodiments.) In particular, the separate prefetch may also be conditioned on the state of a counter that is maintained separately from the counter corresponding to the given memory pointer candidate itself.

FIG. 4 illustrates an example that employs separate counters for adjacent-line prefetching. As shown, QF table 308 also includes a set of adjacent-line counters 420. For compactness, only the hashed PC of the given memory pointer candidate is employed to index adjacent-line counters 420, although in other embodiments, adjacent-line counters 420 may be organized in a multidimensional fashion similar to counters 410. Generally speaking, adjacent-line counters 420 may operate in a similar fashion to counters 410, such as in their manner of being updated to reflect a prefetch cost and a successful prefetch credit. However, adjacent-line counters 420 may store a larger or smaller range of values than counters 410. As described above with respect to counters 410, adjacent-line counters 420 may be reset periodically, at an interval that may be the same as or different from the interval used to reset counters 410.

During operation, when counters 410 are being indexed to retrieve a counter value associated with a given memory pointer candidate, adjacent-line counters 420 may also be accessed to retrieve a particular adjacent-line counter value, which may be tested to determine whether it satisfies a QF counter adjacent-line threshold (e.g., being nonzero, although this threshold may differ from the one used for counters 410). If so, a separate prefetch may be initiated for a cache line that is adjacent to the given memory pointer candidate (e.g., by adding K to the given memory pointer candidate, where K denotes the number of bytes in a cache line). In some embodiments, the separate prefetch may only be initiated if a prefetch is initiated for the given memory pointer candidate (e.g., dependent upon whether the given memory pointer candidate satisfies all of the filters in pointer filter circuit 304). The reverse is not necessarily true—that is, the given memory pointer candidate may satisfy all filter conditions and be prefetched, whereas the particular adjacent-line counter may fail to satisfy its threshold, resulting in no separate prefetch being initiated for the adjacent line.

In addition to history filter 306 and QF table 308, FIG. 3 illustrates a third filter: global QF counter 310. Whereas counters within QF table 308 are selected in a manner that depends on the details of a single memory pointer candidate, global QF counter 310 instead reflects the state of all memory pointer candidates. In various embodiments, global QF counter 310 may be sized similarly to other counters within pointer filter circuit 304, or it may have a unique size. In some embodiments, global QF counter 310 may be updated to reflect a global prefetch cost (e.g., by decrementing) in response to initiation of any prefetch request for any memory pointer candidate, and may be reset to an initial value in response to identification of any successful prefetch for any memory pointer candidate. Like other counters described above, global QF counter 310 may also be periodically reset, with a period that may be either unique or the same as that used for other counters.

During processing of a given memory pointer candidate, global QF counter 310 may be checked to determine whether it satisfies a global QF counter threshold value (e.g., being nonzero). If this threshold is not satisfied, no prefetch may be initiated for the given memory pointer candidate. Generally speaking, global QF counter 310 may operate to temporarily suppress memory pointer prefetch activity if the collective performance of such activity is poor, even if the individual performance of various pointer candidates (e.g., as reflected in QF table 308) would not result in prefetches being suppressed for those candidates.

A given memory pointer candidate that satisfies all of the applicable filters within pointer filter circuit 304 may cause history filter 306 to be updated with information indicative of the candidate (e.g., to reflect that a prefetch is expected to be initiated), and may be stored in a queue or other type of storage circuit for further processing. In some embodiments, the stored information may include the virtual address value corresponding to the memory pointer candidate, the physical address corresponding to the memory pointer candidate (which may not yet be available at the time the candidate is initially stored), a unique transaction identifier that may be employed during the address translation process, the relative offset and hashed PC values for the candidate, and an indication of whether a separate adjacent-line prefetch is to be initiated. If the capacity of the storage structure is reached, either processing of memory pointer candidates may stall, or existing candidates may be overwritten. In some embodiments, power efficiency may favor stalling, in that a substantial amount of energy may have been expended by pointer filter circuit 304 to identify a viable candidate for prefetching, and that expenditure may be effectively wasted if the candidate is subsequently discarded for capacity reasons.

Prefetch Request Caching and Prefetch-Initiated Fill Processing

In some embodiments, before memory pointer candidates can be prefetched, the virtual address corresponding to the candidate may need to be translated to a physical address (e.g., in embodiments where LLC 170 is physically addressed). In such embodiments, after being identified for prefetching by pointer filter circuit 304, a given memory pointer candidate may be temporarily stored while a translation is performed, whereupon the physical address corresponding to the given candidate may be stored and the given candidate may be marked as being ready to be prefetched. In some embodiments, a translation lookaside buffer (TLB) may be accessed to determine whether a virtual-to-physical address translation has already been performed. (The unique transaction identifier described above may facilitate coordination of the translation request with the response received from the TLB.) If the virtual address of the given memory pointer candidate does not hit in the TLB, in some embodiments the given candidate may be discarded, rather than waiting for the translation process to be performed. It is noted that translation may be omitted or deferred to a later processing stage if LLC 170 happens to be virtually rather than physically addressed.

Once the preconditions for prefetching a given memory pointer candidate (e.g., availability of a physical address, if needed) are satisfied, the prefetch request for that candidate may be presented to LLC 170. When multiple pointer candidates are stored in a queue or other storage structure, in some embodiments the oldest memory pointer candidate that is ready for prefetching may be selected first, although other selection schemes may also be employed. In some embodiments, CDP 220 may arbitrate for prefetch access to LLC 170 along with other prefetch requesters according to any suitable arbitration scheme. It is noted that in some embodiments, performing a prefetch request for a given memory pointer candidate may result in corresponding data being installed into LLC 170 without also being installed into L1 data cache 210. For example, installation of the prefetch data into L1 data cache 210 may occur later, in response to a fill request to LLC 170 from L1 data cache 210 (e.g., in response to an L1 cache miss). In other embodiments, however, a prefetch request may result in prefetch data being installed into both LLC 170 and L1 data cache 210 upon completion of the prefetch request.

Once a prefetch request is sent to LLC 170 for a given memory pointer candidate, in some embodiments, information corresponding to the given candidate may be stored within prefetch request cache 312. As described below, this may facilitate the application of a successful prefetch credit to one of counters 410 and/or adjacent-line counters 420 when prefetch data corresponding to the given candidate is subsequently returned from LLC 170.

Figure 5:
FIG. 5 is a block diagram illustrating an embodiment of a prefetch request cache.

An embodiment of prefetch request cache 312 is shown in FIG. 5. In the illustrated embodiment, prefetch request cache 312 may be implemented as a set associative cache that is indexed by a portion of a hashed physical address of a given memory pointer candidate, where the remainder of the hashed physical address is used as a tag. For example, if prefetch request cache 312 includes $2^N$ sets distributed across M ways, the low-order N bits of the hashed physical address may serve as an index to select a particular set, while the remaining bits of the hashed physical address may be compared against the tag values for the M ways of the selected set to determine if there is a hit for any particular way. (In some embodiments, a direct-mapped cache rather than a set-associative cache may be used.) The data that is stored within an entry of prefetch request cache 312 may include QF table index information corresponding to a given memory pointer candidate. For example, the QF table index information may include the values of the hashed PC and relative offset that were used to access counters 410 to retrieve a counter value corresponding to the given memory pointer candidate, and may also include an indication (which may be a single bit) of whether a separate adjacent-line prefetch is also being performed.

When a data cache line fill destined for L1 data cache 170 arrives at load/store unit 140 from LLC 170, the fill may be marked as corresponding to a prefetch request that was initiated by CDP 220. When such a fill is detected, prefetch request cache 312 may be accessed to determine if it contains QF table index information that corresponds to the fill. For example, the hashed physical address corresponding to the fill may be used to index prefetch request cache 312 and determine whether there is a cache hit.

If a cache hit occurs, the retrieved QF table index information may then be used to update a counter of QF table 308. For example, the hashed PC and relative offset values may be used to select a counter value from counters 410 and update the selected value to reflect a successful prefetch credit (e.g., by incrementing the counter). In some embodiments, if the retrieved QF table index information indicates that an adjacent-line prefetch was performed, an appropriate one of adjacent-line counters 420 may also be updated to reflect the successful prefetch credit. Additionally, in some embodiments, any successful prefetch may result in global QF counter 310 being reset to its initial value.

It is noted that when a hashed physical address is used to index prefetch request cache 312, collisions between different data cache line fills may occur. For example, it is possible that a fill corresponding to one memory pointer candidate might hit an entry of prefetch request cache 312 corresponding to a different memory pointer candidate. As a result, it may not be guaranteed that the counter(s) of QF table 308 that are credited with a fill are the same as the counter(s) that were originally charged the cost of the prefetch. However, as discussed above with respect to other instances of hash collisions, performance modeling may be employed to tune the implementation in order to reduce the frequency and effect of such collisions. It is noted that in general, the benefits of a more compact implementation that may arise from the use of hashing may outweigh the loss of fidelity that hashing may introduce.

In some instances, a data cache line fill may result in a miss within prefetch request cache 312. For example, because prefetch request cache 312 has finite capacity, the entry corresponding to a given memory pointer candidate may be evicted by subsequent activity before a corresponding prefetch can be completed. In such cases, it may not be possible to update QF table 308. However, global QF counter 310 may nevertheless be reset to its initial value in this case.

In some embodiments, counters 410 and adjacent-line counters 420 may specifically be updated to reflect a successful prefetch credit dependent upon an indication that the data cache line fill resulted from a cache hit in LLC 170. This may be indicated in a variety of ways. For example, in some embodiments, data cache line fills may arrive from LLC 170 only in the event of a cache hit in LLC 170, and may arrive from some other source in the event of a cache miss in LLC 170; accordingly, the source of the data cache line fill may implicitly reflect whether an LLC cache hit occurred. In other embodiments, all data cache line fills into L1 data cache 210 may be sourced from LLC 170, even if they did not result from an LLC cache hit (e.g., LLC 170 may pass through prefetch data arriving from another level of the memory hierarchy). In such embodiments, LLC cache hit information may be explicitly indicated along with the fill.

It is noted that in some embodiments of CDP 220, prefetch request cache 312 may be omitted. For example, the QF table index information that would otherwise have been cached could instead be forwarded to LLC 170 along with a prefetch request, and returned from LLC 170 with a corresponding data cache line fill. Such an approach would also eliminate the possibility of misses or hash collisions occurring with respect to prefetch request cache 312, although the design complexity of LLC 170 would be increased.

Figure 6:
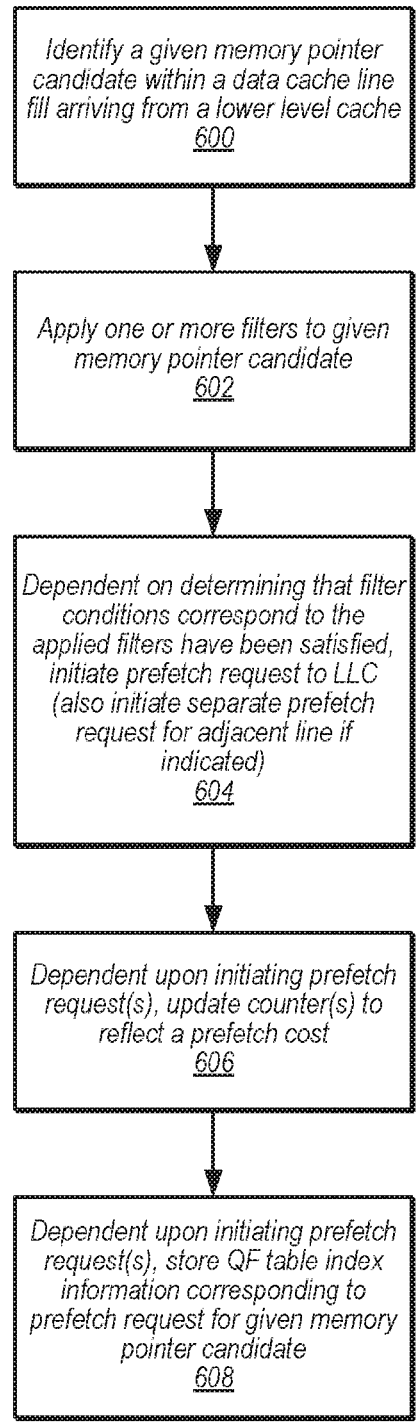
FIG. 6 is a flow diagram illustrating an embodiment of a method of memory pointer candidate detection and associated content-directed prefetch initiation.
Figure 7:
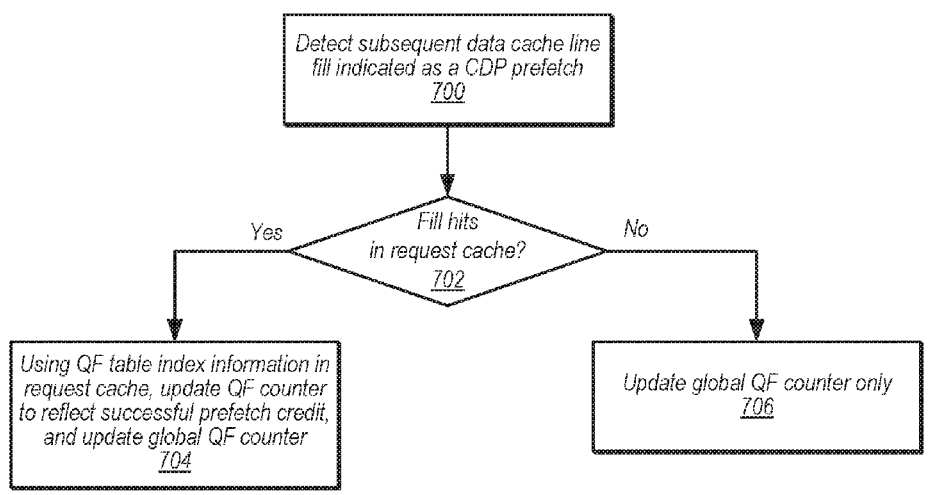
FIG. 7 is a flow diagram illustrating an embodiment of a method of processing a data cache line fill resulting from a content-directed prefetch.

To summarize the forgoing discussion, FIGS. 6 and 7 represent embodiments of various methods of operation of CDP 220. The following are noted: these illustrations describe only possible examples of operational flow; operations need not be performed in the precise order shown; the methods shown may be performed concurrently with one another by CDP 220; and particular operations may be added or omitted in various embodiments.

FIG. 6 is directed to an embodiment of memory pointer candidate detection and associated content-directed prefetch initiation. Operation begins at block 600 where a given memory pointer candidate is identified within a data cache line fill arriving from a lower level cache. For example, pointer detection circuit 302 may scan an incoming cache line fill as described above to identify memory pointer candidates within the fill, e.g., by determining whether certain higher-order bits of the pointer candidate match higher-order bits of the address of the cache line itself.

One or more filters may then be applied to the given memory pointer candidate (block 602). These filters may present a set of conditions that need to be satisfied in order to initiate a prefetch request for the given candidate. One example of a filter may include QF table 308, which, as described above, may include a multidimensional table that stores counters 410 and is indexed by multiple independently-determined index values (such as, e.g., a hashed PC value and a relative offset value associated with the given candidate). A particular counter corresponding to the given candidate may be retrieved from QF table 308 and evaluated to determine whether it satisfies a QF counter threshold value. If so, the QF table filter may be satisfied. In some embodiments, a selected one of adjacent-line counters 420 may also be evaluated to determine whether to initiate a separate prefetch request for an adjacent line.

Although QF table 308 may be implemented as the sole filter, other filters may also be employed, and in some embodiments, all filter conditions must be satisfied in order to initiate a prefetch request. For example, as discussed above, history filter 306 may represent a history of recently fetched memory pointer candidates. To satisfy the condition presented by history filter 306, a given memory pointer candidate should not correspond to any entry within history filter 306 (conversely, such a correspondence may disqualify the given candidate from being prefetched again). Also, global QF counter 310 may represent a global quality of prefetch activity rather than an indication that is specific to a particular memory pointer candidate. The condition presented by global QF counter 310 may be satisfied if its value satisfies a global QF counter threshold value.

Dependent upon determining that the filter conditions corresponding to the applied filters have been satisfied, a prefetch request may be initiated (block 604). In some embodiments, initiation of the prefetch request may include storing the given memory pointer candidate in a queue or other storage structure pending dispatch to LLC 170; that is, a prefetch request for the given candidate may be considered to be initiated when all filter conditions have been satisfied, even if the request has not yet been sent to LLC 170. In other embodiments, initiation of a prefetch request may be deemed to occur only when the request has actually been dispatched to LLC 170.

In some embodiments, a prefetch request may remain resident within CDP 220 until certain dispatch conditions are met (e.g., availability of a physical address translation, if applicable; dispatch of all older prefetch requests, etc.). Moreover, a separate prefetch request may also be initiated to prefetch a cache line adjacent to the given memory pointer candidate if the selected adjacent-line counter 420 satisfies the appropriate threshold value.

Dependent upon initiating the prefetch request, one or more counters may be updated to reflect a prefetch cost (block 606). For example, both global QF counter 310 and the counter 410 that is indexed by the given memory pointer candidate may be decremented. If a separate prefetch request is initiated, a corresponding adjacent-line counter 420 may also be decremented. In some embodiments, updating counters to account for a prefetch cost may occur when all relevant filter conditions have been satisfied, even if the corresponding prefetch request has not yet been dispatched to LLC 170. In other embodiments, the update may be performed dependent upon actually dispatching the prefetch request.

Further dependent upon initiating the prefetch request, QF table index information corresponding to the prefetch request for the given memory pointer candidate may be stored (block 608). For example, as described above, the hashed PC and relative offset associated with the given candidate (along with an indication of whether an adjacent-line prefetch is also being performed, in some embodiments) may be stored within prefetch request cache 312 using a hashed version of the physical address of the prefetch request to access the cache. In various embodiments, prefetch request cache 312 may be written only when a prefetch request is dispatched to LLC 170, or at an earlier stage.

FIG. 7 is directed to an embodiment of processing a data cache line fill resulting from a content-directed prefetch. Operation begins at block 700 where a subsequent data cache line fill (e.g., subsequent to the fill discussed above with respect to FIG. 6) arriving from the lower level cache is detected as resulting from a content-directed prefetch (which may also be referred to as a prefetch-initiated fill). For example, when prefetches are issued to LLC 170 by CDP 220, the resulting data may be flagged by LLC 170 as being a prefetch-initiated fill. In some embodiments, further processing of the prefetch-initiated fill may be dependent upon the fill's having resulted from a cache hit within LLC 170. For example, as discussed above, fills arriving from LLC 170 may implicitly result from an LLC cache hit in embodiments where LLC cache misses result in fills from a different source. Alternatively, the LLC hit/miss status of a fill may be explicitly indicated (e.g., via a status bit).

In response to detecting a prefetch-initiated fill, a lookup is performed to determine whether the fill hits within a prefetch request cache (block 702). For example, the hashed physical address corresponding to the fill may be determined and used to index prefetch request cache 312, resulting in a tag compare to determine hit or miss status.

In response to detecting a hit in the prefetch request cache, QF table information resulting from the hit may be used to update a corresponding QF table counter to reflect a successful prefetch credit, and a global QF counter may also be updated (block 704). For example, a hit within prefetch request cache 312 may result in retrieving a hashed PC, relative offset, and adjacent-line indication that was previously stored for a prefetched memory pointer candidate (e.g., at block 608 of FIG. 6). This information may be used to index counters 410 (and, if indicated, adjacent-line counters 420), and to apply a successful prefetch credit to the indexed counter(s) (e.g., by incrementing them). Additionally, global QF counter 310 may be reset to its initial (e.g., maximum) value by a successful prefetch.

In response to detecting a miss in the prefetch request cache, only the global QF counter may be updated (block 706). If no QF table index information can be retrieved from prefetch request cache 312 because of a miss, it may not be possible to credit counters 410 and adjacent-line counters 420 with a successful prefetch. However, because global QF counter 310 is not specific to a particular memory pointer candidate, it can still be updated in this case.

As noted above, in some embodiments, prefetch request cache 310 may be omitted. Instead, the QF table index information associated with a given memory pointer candidate may accompany the prefetch request and be returned from LLC 170 along with the fill data. In such embodiments, fill processing may proceed in a manner similar to that shown in FIG. 7, except that blocks 702 and 706 (relating to the possibility of a prefetch request cache miss) may be eliminated.

Example Computing System

Figure 8:
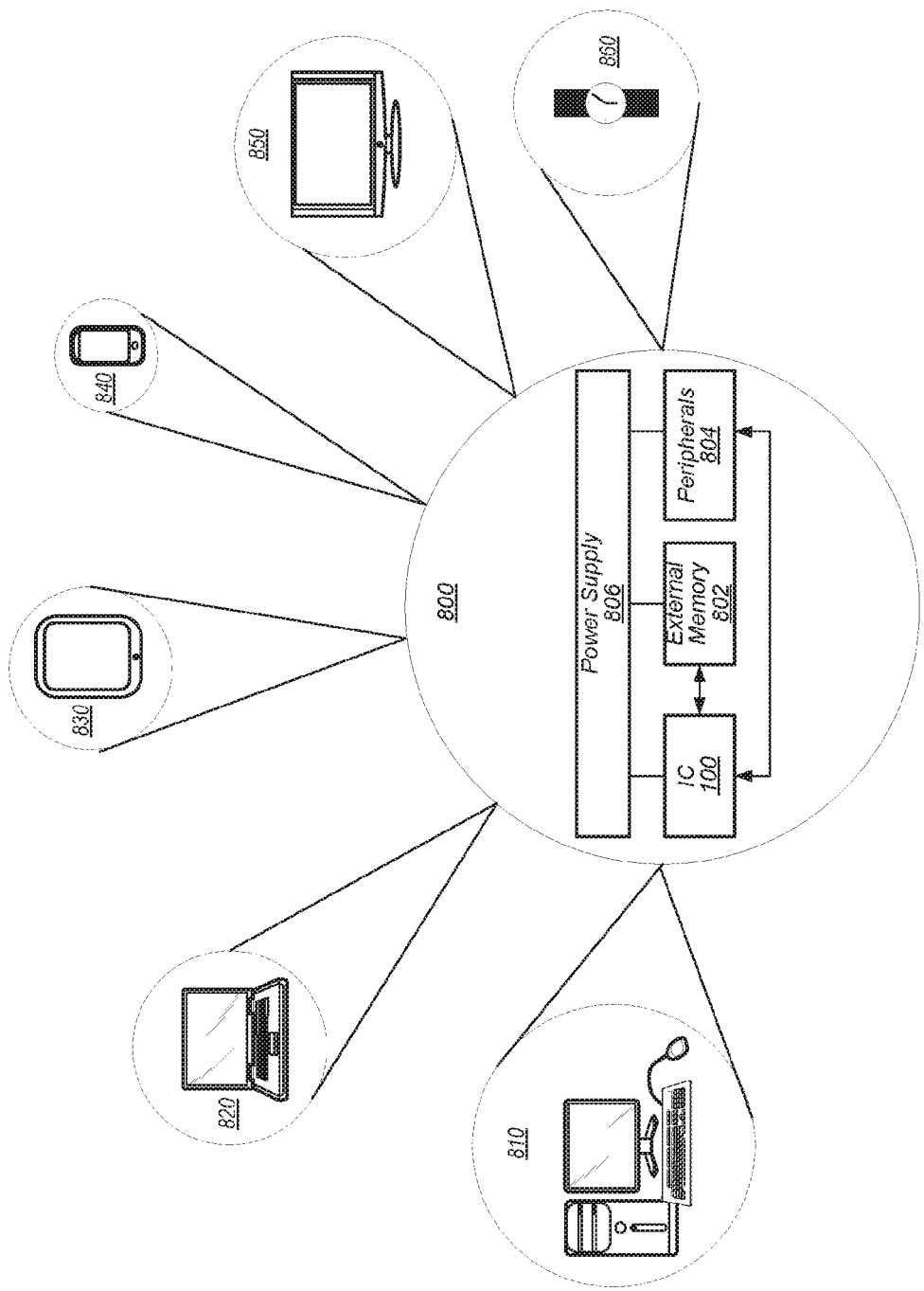
FIG. 8 is a block diagram of an embodiment of a system.

Referring next to FIG. 8, a block diagram of one embodiment of a system 800 is shown. As shown, system 800 may represent chip, circuitry, components, etc., of a desktop computer 810, laptop computer 820, tablet computer 830, cell or mobile phone 840, television 850 (or set top box configured to be coupled to a television), wrist watch or other wearable item 860, or otherwise. Other devices are possible and are contemplated. In the illustrated embodiment, the system 800 includes at least one instance of integrated circuit 100 (of FIG. 1) coupled to an external memory 802. In various embodiments, integrated circuit 100 may be a processor included within a system on chip (SoC) or larger integrated circuit (IC) which is coupled to external memory 802, peripherals 804, and power supply 806. Integrated circuit 100 may employ any of the structures or techniques described above with respect to FIGS. 2-7, or variations thereof.

Integrated circuit 100 is coupled to one or more peripherals 804 and the external memory 802. A power supply 806 is also provided which supplies the supply voltages to processor 100 as well as one or more supply voltages to the memory 802 and/or the peripherals 804. In various embodiments, power supply 806 may represent a battery (e.g., a rechargeable battery in a smart phone, laptop or tablet computer). In some embodiments, more than one instance of integrated circuit 100 may be included (and more than one external memory 802 may be included as well).

The memory 802 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an SoC or IC containing integrated circuit 100 in a chip-on-chip configuration, a package-on-package configuration, or a multi-chip module configuration.

The peripherals 804 may include any desired circuitry, depending on the type of system 800. For example, in one embodiment, peripherals 804 may include devices for various types of wireless communication, such as wifi, Bluetooth, cellular, global positioning system, etc. The peripherals 804 may also include additional storage, including RAM storage, solid state storage, or disk storage. The peripherals 804 may include user interface devices such as a display screen, including touch display screens or multi-touch display screens, keyboard or other input devices, microphones, speakers, etc.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus, comprising:
   a pointer detection circuit that, during operation, scans a data cache line fill arriving from a lower level cache and identifies a given memory pointer candidate within the data cache line fill, wherein the lower level cache is at a lower level of a memory hierarchy relative to the data cache;
   a pointer filter circuit that, during operation, initiates a prefetch request to the lower level cache for the given memory pointer candidate dependent on determining that the given memory pointer candidate satisfies a set of conditions, wherein:
      the pointer filter circuit comprises a quality factor (QF) table that stores a plurality of counters and is indexed dependent upon a program counter address associated with the given memory pointer candidate and a relative cache line offset of the given memory pointer candidate;
      the set of conditions includes a determination that a given one of the plurality of counters indexed by the given memory pointer candidate satisfies a QF counter threshold value;
      in response to initiation of the prefetch request for the given memory pointer candidate, the pointer filter circuit, during operation, updates the given one of the plurality of counters to reflect a prefetch cost; and
      in response to determining that a subsequent data cache line fill arriving from the lower level cache corresponds to the prefetch request for the given memory pointer candidate, the pointer filter circuit, during operation, updates a particular one of the plurality of counters to reflect a successful prefetch credit.

2. The apparatus of claim 1, wherein the QF table is indexed dependent upon a hashed version of the program counter address associated with the given memory pointer candidate.

3. The apparatus of claim 1, wherein:
   the QF table further stores a plurality of adjacent-line counters indexed dependent upon the program counter address associated with the given memory pointer candidate;
   the pointer filter circuit, during operation, further initiates a separate prefetch request to the lower level cache for a cache line that is adjacent to the given memory pointer candidate dependent upon a determination that a given one of the plurality of adjacent-line counters corresponding to the given memory pointer candidate satisfies an adjacent-line QF counter threshold value; and
   in response to initiation of the separate prefetch request for the given memory pointer candidate, the pointer history filter, during operation, updates the given one of the plurality of adjacent-line counters to reflect the prefetch cost.

4. The apparatus of claim 3, wherein in response to determining that the subsequent data cache line fill arriving from the lower level cache corresponds to the separate prefetch request for the given memory pointer candidate, the pointer history filter, during operation, updates a particular one of the plurality of adjacent-line counters to reflect the successful prefetch credit.

5. The apparatus of claim 1, further comprising a prefetch request cache that, during operation, stores QF table index information corresponding to the prefetch request for the given memory pointer candidate, wherein in response to detecting a prefetch-initiated fill arriving from the lower level cache:
   the prefetch request cache, during operation, retrieves the QF table index information corresponding to the prefetch request for the given memory pointer candidate; and
   the pointer filter circuit, during operation, updates a counter of the QF table that is indexed by the QF table index information to reflect a successful prefetch credit.

6. The apparatus of claim 5, wherein in response to the prefetch request cache failing to retrieve QF table index information corresponding to the prefetch request for the given memory pointer candidate, the pointer filter circuit, during operation, updates a global quality factor counter without updating a counter of the QF table.

7. The apparatus of claim 1, wherein the update of the particular one of the plurality of counters by the pointer filter circuit to reflect a successful prefetch credit is further dependent upon an indication that the subsequent cache line fill resulted from a cache hit in the lower level cache.

8. The apparatus of claim 1, wherein:
   a prefetch-initiated fill arriving from the lower level cache contains QF table index information indicating that the prefetch-initiated fill corresponds to a previously initiated prefetch request; and
   the pointer filter circuit, during operation, updates a counter of the QF table that is indexed by the QF table index information to reflect a successful prefetch credit.

9. The apparatus of claim 1, wherein:
   the pointer filter circuit further comprises a global quality factor counter;
   the set of conditions includes a determination that the global quality factor counter satisfies a global quality filter counter threshold value;
   during operation, the global quality factor counter is updated to reflect a global prefetch cost in response to initiation of any prefetch request and is reset to an initial value in response to identification of any successful prefetch.

10. The apparatus of claim 1, wherein:
    the pointer filter circuit further comprises a history filter that, during operation, stores information indicative of a set of memory pointer candidates for which prefetch requests have been initiated; and
    the set of conditions further includes a determination that information indicative of the given memory pointer candidate is not present within the history filter.

11. A processor, comprising:
    a processor core including a data cache and a content-directed prefetcher, wherein the content-directed prefetcher includes a quality factor (QF) table that stores a plurality of counters and is indexed according to a plurality of independently-determined index values; and
    a lower level cache at a lower level of a memory hierarchy relative to the data cache;
    wherein during operation, the content-directed prefetcher:
      identifies, within a data cache line fill arriving from the lower level cache, a given memory pointer candidate;
      initiates a prefetch request to the lower level cache for the given memory pointer candidate dependent on determining that the given memory pointer candidate satisfies a set of conditions, wherein the set of conditions includes a determination that a given one of the plurality of counters corresponding to the given memory pointer candidate satisfies a QF counter threshold value;
      in response to initiation of the prefetch request for the given memory pointer candidate, updates the given one of the plurality of counters to reflect a prefetch cost; and
      based on determining that a subsequent data cache line fill arriving from the lower level cache corresponds to the prefetch request for the given memory pointer candidate, updates a particular one of the plurality of counters to reflect a successful prefetch credit.

12. The processor of claim 11, wherein the plurality of independently-determined index values includes at least one of: a portion of a program counter address associated with the given memory pointer candidate; a hashed value of the program counter address associated with the given memory pointer candidate; a relative cache line offset of the given memory pointer candidate; information indicative of a total number of memory pointer candidates detected within the data cache line fill; information indicative of a recursive depth of the given memory pointer candidate; or information indicative of a region of virtual memory addresses in which the given memory pointer candidate is located.

13. The processor of claim 11, wherein completion of the prefetch request for the given memory pointer candidate results in data corresponding to the prefetch request being installed into the lower level cache without also being installed into the data cache.

14. The processor of claim 13, wherein subsequent to completion of the prefetch request for the given memory pointer candidate, data corresponding to the prefetch request is installed into the data cache in response to a fill request from the data cache to the lower level cache.

15. The processor of claim 11, wherein:
    the QF table further stores a plurality of adjacent-line counters;
    the content-directed prefetcher, during operation, further initiates a separate prefetch request to the lower level cache for a cache line that is adjacent to the given memory pointer candidate dependent upon a determination that a given one of the plurality of adjacent-line counters corresponding to the given memory pointer candidate satisfies the QF counter threshold value; and
    the content-directed prefetcher, during operation, updates the given one of the plurality of adjacent-line counters to reflect the prefetch cost due to the separate prefetch request.

16. The processor of claim 15, wherein in response to determining that the subsequent data cache line fill arriving from the lower level cache corresponds to the separate prefetch request for the given memory pointer candidate, the content-directed prefetcher, during operation, updates a particular one of the plurality of adjacent-line counters to reflect the successful prefetch credit.

17. The processor of claim 11, wherein the content-directed prefetcher further comprises:
a prefetch request cache that, during operation, stores QF table index information corresponding to the prefetch request for the given memory pointer candidate, wherein in response to detecting a prefetch-initiated fill arriving from the lower-level cache:
the prefetch request cache, during operation, retrieves the QF table index information corresponding to the prefetch request for the given memory pointer candidate;
the content-directed prefetcher, during operation, updates a counter of the QF table that is indexed by the QF table index information to reflect a successful prefetch credit; and
a global quality factor counter that, during operation, is updated to reflect a global prefetch cost in response to initiation of any prefetch request and is reset to an initial value in response to identification of any successful prefetch.

18. A method, comprising:
identifying a given memory pointer candidate within a data cache line fill arriving from a lower level cache, wherein the lower level cache is at a lower level of a memory hierarchy relative to a data cache;
retrieving a counter value corresponding to the given memory pointer candidate from a multidimensional quality factor (QF) table, wherein the QF table stores a plurality of counters that are indexed according to a plurality of independently-determined index values;
retrieving an adjacent-line counter value corresponding to the given memory pointer candidate from the QF table, wherein the QF table additionally stores a plurality of adjacent-line counters;
initiating a prefetch request to the lower level cache for the given memory pointer candidate dependent upon determining that the counter value satisfies a QF counter threshold value;
initiating a separate prefetch request to the lower level cache for a cache line that is adjacent to the given memory pointer candidate dependent upon determining that the adjacent-line counter value satisfies a QF adjacent-line counter threshold value;
updating the counter value stored in the QF table to reflect a prefetch cost associated with initiating the separate prefetch;
updating the adjacent-line counter value stored in the QF table to reflect the prefetch cost; and
in response to determining that a subsequent data cache line fill arriving from the lower level cache corresponds to either the prefetch request or the separate prefetch request, respectively updating a particular one of the plurality of counters or a particular one of the plurality of adjacent-line counters to reflect a successful prefetch credit.

19. The method of claim 18, wherein the plurality of counters is indexed according to a hashed program counter address associated with the given memory pointer candidate and a relative cache line offset of the given memory pointer candidate, and wherein the plurality of adjacent-line counters is indexed according to the hashed program counter address associated with the given memory pointer candidate.

20. The method of claim 18, wherein initiating the separate prefetch request is further dependent upon initiating the prefetch request.

* * * * *